United States Patent
Chono et al.

(10) Patent No.: US 12,033,433 B2
(45) Date of Patent: Jul. 9, 2024

(54) IRIS RECOGNITION APPARATUS, IRIS RECOGNITION METHOD, COMPUTER PROGRAM AND RECORDING MEDIUM

(71) Applicant: NEC Corporation, Tokyo (JP)

(72) Inventors: Keiichi Chono, Tokyo (JP); Masato Tsukada, Tokyo (JP); Chisato Funayama, Tokyo (JP); Takahiro Toizumi, Tokyo (JP); Yuka Ogino, Tokyo (JP); Ryuichi Akashi, Tokyo (JP); Ryo Yamakabe, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 17/621,760

(22) PCT Filed: Jun. 25, 2019

(86) PCT No.: PCT/JP2019/025107
§ 371 (c)(1),
(2) Date: Dec. 22, 2021

(87) PCT Pub. No.: WO2020/261368
PCT Pub. Date: Dec. 30, 2020

(65) Prior Publication Data
US 2022/0270406 A1    Aug. 25, 2022

(51) Int. Cl.
*G06V 40/19* (2022.01)
(52) U.S. Cl.
CPC .................................. *G06V 40/19* (2022.01)
(58) Field of Classification Search
CPC ...................................................... G06V 40/19
See application file for complete search history.

(56) References Cited

U.S. PATENT DOCUMENTS

| 2005/0084179 | A1 | 4/2005 | Hanna et al. |
| 2006/0274919 | A1* | 12/2006 | Lolacono ............ G06V 10/945 |
| | | | 382/117 |
| 2008/0316325 | A1* | 12/2008 | Nakahara ............ H04N 23/675 |
| | | | 348/222.1 |
| 2010/0271537 | A1 | 10/2010 | Endoh et al. |
| 2012/0217764 | A1 | 8/2012 | Ishiguro et al. |

(Continued)

FOREIGN PATENT DOCUMENTS

| JP | 2007-504562 A | 3/2007 |
| JP | 2008-006149 A | 1/2008 |

(Continued)

OTHER PUBLICATIONS

Extended European Search Report for EP Application No. EP19934618.0 dated on May 25, 2022.

(Continued)

*Primary Examiner* — Edward Park
(74) *Attorney, Agent, or Firm* — Sughrue Mion, PLLC (57) ABSTRACT

An iris recognition apparatus for performing recognition of a target person based on an iris pattern of the target person, is provided with: an imaging device that performs an imaging processing for sequentially outputting imaged images while changing a focal position; and a determining device that starts a focusing determination for determining whether or not an image is a focused image before the imaging device completes the imaging processing.

9 Claims, 4 Drawing Sheets

(56) References Cited

U.S. PATENT DOCUMENTS

2015/0071503 A1* 3/2015 Prabhakar .............. G06F 18/22
  382/117
2015/0310272 A1 10/2015 Wang
2020/0112687 A1* 4/2020 Arano .................. H04N 23/675

FOREIGN PATENT DOCUMENTS

| | | |
|---|---|---|
| JP | 2008-052317 A | 3/2008 |
| JP | 2010-258552 A | 11/2010 |
| JP | 2011-105058 A | 6/2011 |
| JP | 2017-083962 A | 5/2017 |
| WO | 2009/016846 A1 | 2/2009 |
| WO | 2016/058528 A1 | 4/2016 |

OTHER PUBLICATIONS

Liao Wenzhe et al, "Design of a Wide Working Range Lens for Iris Recognition", Sep. 21, 2016, pp. 339-348.
International Search Report for PCT Application No. PCT/JP2019/025107, dated Sep. 10, 2019.
JP Office Action for JP Application No. 2023-066471, mailed on Apr. 30, 2024 with English Translation.

* cited by examiner

IRIS RECOGNITION APPARATUS, IRIS RECOGNITION METHOD, COMPUTER PROGRAM AND RECORDING MEDIUM

This application is a National Stage Entry of PCT/JP2019/025107 filed on Jun. 25, 2019, the contents of all of which are incorporated herein by reference, in their entirety.

TECHNICAL FIELD

This disclosure relates to the technical field of an iris recognition apparatus, an iris recognition method, a computer program and a recording medium.

BACKGROUND ART

This type of apparatus has a technical problem in that if a distance between an iris (i.e., a subject) of a target person and a camera changes during imaging, it is difficult to image an image in focus. For this problem, for example, it is proposed that an apparatus imaging a plurality of images by moving a lens of a camera in an optical axis direction so as to focus at each of a plurality of focusing positions predetermined, then selecting one image, which is estimated to be in focus, from the plurality of images, and performing iris recognition (see Patent Literature 1). Patent Literatures 2 and 3 are listed as other related technique.

CITATION LIST

Patent Literature

Patent Literature 1: Japanese Patent Application Laid Open No. 2017-083962
Patent Literature 2: Japanese Patent Application Laid Open No. 2010-258552
Patent Literature 3: Japanese Patent Application Laid Open No. 2008-052317

SUMMARY

Technical Problem

In the technique described in Patent Literature 1, even if an image imaged at first is an image in focus, iris recognition is not performed until a plurality of images are imaged. Therefore, the technique described in Patent Literature 1 has a technical problem that the time required for iris recognition becomes relatively long.

This disclosure has been made in view of the above-mentioned problem. An object of this disclosure is to provide an iris recognition apparatus, an iris recognition method, a computer program, and a recording medium, that can reduce the time required for iris recognition.

Solution to Problem

An aspect of an iris recognition apparatus of this disclosure is an iris recognition apparatus for performing recognition of a target person based on an iris pattern of the target person, the iris recognition apparatus is provided with: an imaging device that performs an imaging processing for sequentially outputting imaged images while changing a focal position; and a determining device that starts a focusing determination for determining whether or not an image is a focused image before the imaging device completes the imaging processing.

An aspect of an iris recognition method of this disclosure is an iris recognition method for performing recognition for a target person based on an iris pattern of the target person in an iris recognition apparatus having an imaging device, the iris recognition method comprising: the imaging device performing an imaging processing for sequentially outputting imaged images while changing a focal position; and starting a focusing determination for determining whether or not an image is a focused image before the imaging device completes the imaging processing.

An aspect of a computer program of this disclosure causes a computer to execute the one aspect of the iris recognition method as described above.

An aspect of a recording medium of this disclosure is a recording medium in which the one aspect of the computer program as described above is recorded.

Effect

According to one aspect of each of the iris recognition apparatus, the iris recognition method, the computer program, and the recording medium as described above, it is possible to reduce the time required for iris recognition.

DESCRIPTION OF EMBODIMENTS

Embodiments of an iris recognition apparatus, an iris recognition method, a computer program and a recording medium will be described with reference to figures. Here, in iris recognition, recognition for a target person is performed based on the iris pattern of the target person. An iris, which is a doughnut-shaped tissue, has a very complex and indigenous pattern for each person. A diameter of an iris of a person is about 1 cm. It is desirable to image an iris at an imaging magnification of, for example, about 50 μm/px in order to perform iris recognition using images, in which an iris is imaged. If a target person (in other words, a subject) moves slightly due to, for example, reflective motion, etc. during imaging, an iris may be out of focus. Because the greater an imaging magnification, the narrower a depth of field. In the following, embodiments of an iris recognition apparatus, an iris recognition method, a computer program and a recording medium will be described by using an iris recognition apparatus 1 which can perform iris recognition even if a target person moves slightly.

(Configuration)

Figure 1:
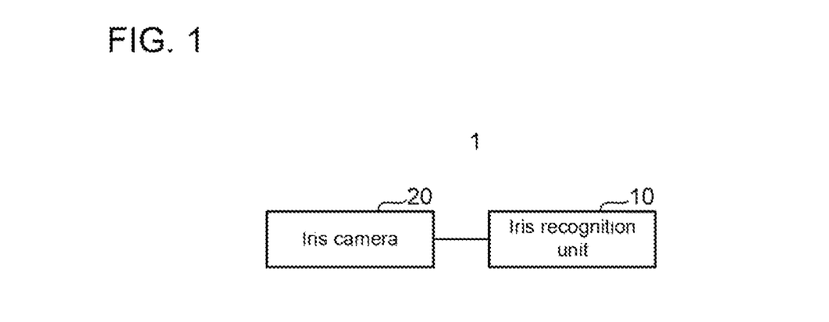
FIG. 1 is a block diagram showing an entire configuration of an iris recognition apparatus of an embodiment.

The entire configuration of the iris recognition apparatus 1 of the embodiment will be described with reference to FIG. 1. FIG. 1 is a block diagram showing the entire configuration of iris recognition apparatus 1 of the embodiment.

In FIG. 1, the iris recognition apparatus 1 is configured to comprise the iris recognition unit 10 and the iris camera 20. The iris camera 20 is installed so that an eye area of a target person can be suitably imaged when the target person of iris recognition is at a predetermined place (e.g., at a position designated by a footprint mark, at a position to be seated, etc.). Incidentally, the iris camera 20 corresponds to an example of an "imaging unit" in supplementary note described later.

Figure 2:
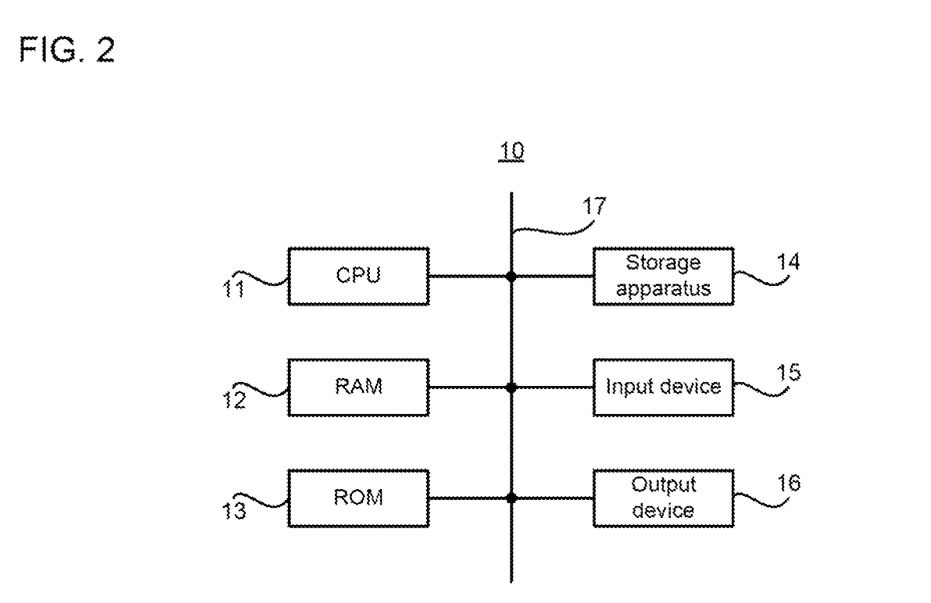
FIG. 2 is a block diagram showing a hardware configuration of an iris recognition unit of the embodiment.

The hardware configuration of the iris recognition unit 10 will be described with reference to FIG. 2. FIG. 2 is a block diagram showing a hardware configuration of the iris recognition unit 10 of the embodiment.

In FIG. 2, the iris recognition unit 10 comprises the CPU (Central Processing Unit) 11, the RAM (Random Access Memory) 12, the ROM (Read Only Memory) 13, the storage apparatus 14, the input device 15 and the output device 16. The CPU 11, the RAM 12, the ROM 13, the storage apparatus 14, the input device 15 and the output device 16 are interconnected each other via a data bus 17.

The CPU 11 reads computer programs. For example, the CPU 11 may read a computer program stored in at least one of the RAM 12, the ROM 13 and the storage apparatus 14. For example, the CPU 11 may read a computer program stored in a computer-readable recording medium by using a recording medium reading apparatus not shown. The CPU 11 may acquire (i.e., read) a computer program from an apparatus not shown located outside the iris recognition unit 10 via a network interface.

The CPU 11 controls the RAM 12, the storage apparatus 14, the input device 15 and the output device 16 by executing the read computer program. In this embodiment, in particular, logical functional blocks for performing iris recognition are implemented in the CPU 11 by the CPU 11 executing the read computer program. In other words, the CPU 11 can function as a controller for performing iris recognition.

Figure 3:
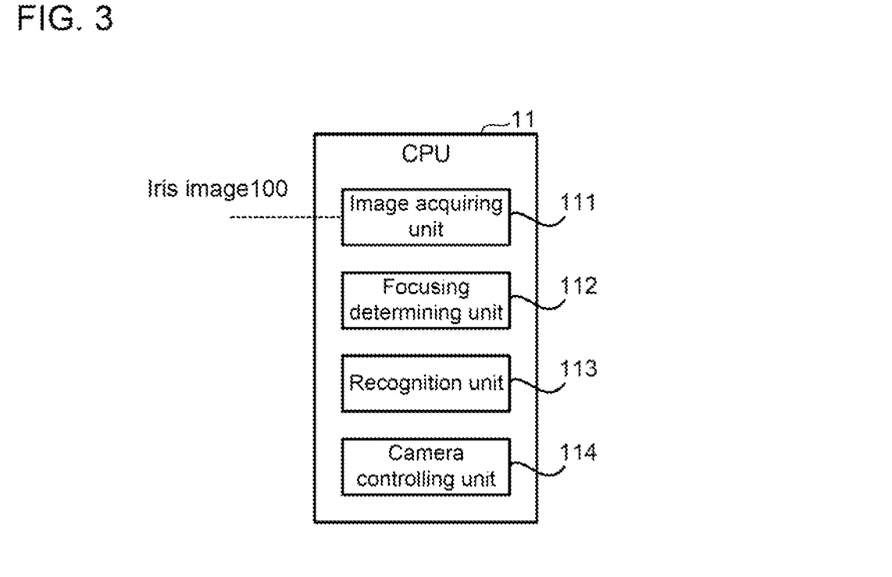
FIG. 3 is a block diagram showing functional blocks implemented in a CPU provided in the iris recognition unit of the embodiment.

In the CPU 11, as shown in FIG. 3, the image acquiring unit 111, the focusing determining unit 112, the recognition unit 113 and the camera controlling unit 114 are realized as logical functional blocks. The operation of each of the image acquiring unit 111, the focusing determining unit 112, the recognition unit 113 and the camera controlling unit 114 will be described later. Incidentally, the focusing determining unit 112 and the camera controlling unit 114 correspond to examples of a "determining device" and a "controlling device" in supplementary note to be described later.

Returning to FIG. 2, the RAM 12 temporarily stores computer programs executed by CPU 11. The RAM 12 temporarily stores data that the CPU 11 uses temporarily while the CPU 11 executes computer programs. The RAM 12 may be, for example, D-RAM (Dynamic RAM).

The ROM 13 stores computer programs executed by the CPU 11. The ROM 13 may store other fixed data. The ROM 13 may be, for example, P-ROM (Programmable ROM).

The storage apparatus 14 stores data that the iris recognition apparatus 1 saves in long-term. The storage apparatus 14 may act as a temporary storage apparatus for the CPU 11. The storage apparatus 14 may include, for example, at least one of a hard disk apparatus, a magneto-optical disk apparatus, an SSD (Solid State Drive) and a disk array apparatus.

The input device 15 is an apparatus that receives input instructions from a user of the iris recognition apparatus 1. The input device 15 may include, for example, at least one of a keyboard, a mouse and a touch panel.

The output device 16 is an apparatus for outputting information about the iris recognition apparatus 1 to the outside. For example, the output device 16 may be a display apparatus capable of displaying information about the iris recognition apparatus 1.

(Operation)

Figure 4:
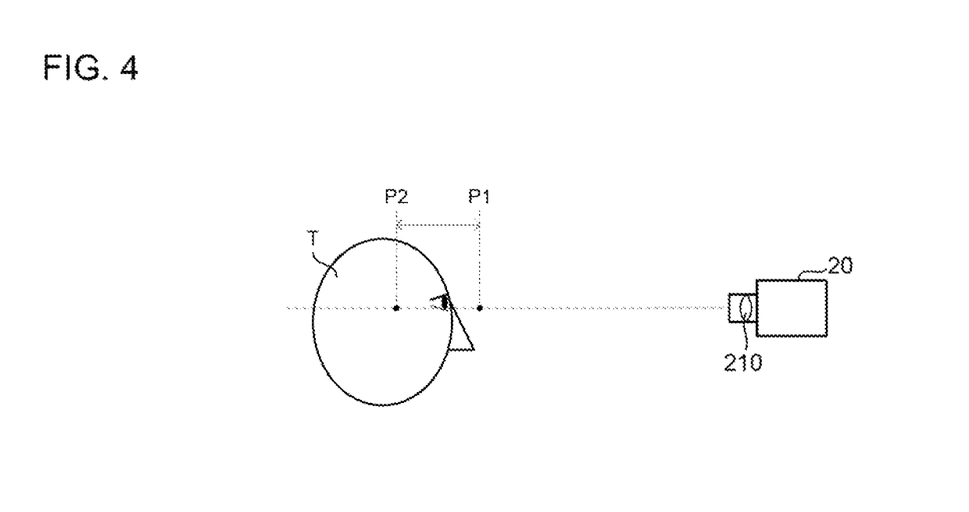
FIG. 4 is a conceptual diagram showing a concept of a moving range of a focal position of an iris camera of the embodiment.

The operation of the iris recognition apparatus 1 configured as described above will be described. First, the operation of the iris camera 20 will be described with reference to FIG. 4. FIG. 4 is a conceptual diagram showing a concept of a moving range of a focal position of the iris camera of the embodiment.

As shown in FIG. 4, the iris camera 20 performs imaging while changing the focal position between the position P1 and the position P2 on the optical axis thereof. More specifically, the iris camera 20 performs imaging while changing the focal position so as to gradually approach the position P2 from the position P1. Thereafter, the iris camera 20 performs imaging while changing the focal position so as to gradually approach the position P1 from the position P2. This operation may be performed repeatedly or only once. It is needless to say that the iris camera 20 may perform imaging while changing the focal position so as to gradually approach the position P1 from the position P2, and then perform imaging while changing the focal position so as to gradually approach the position P2 from the position P1.

In this embodiment, in particular, the iris camera 20 does not adjust its focal position (i.e., focus) on the basis of, for example, the distance between the target person T and the iris camera 20 during imaging. This is because the iris recognition apparatus 1 assumes that the target person T moves slightly due to, for example, reflective motion or the like. In other words, even if the distance between the target person T and the iris camera 20 at a certain moment is detected, the distance may change due to the slightly movement of the target person T at the next moment. Thus, the iris camera 20 images an area (e.g., an area between the position P1 and the position P2 in FIG. 4) where the target person T (strictly speaking, the iris of the target person T) would be present, while changing the focal position.

The iris camera 20 has an optical system capable of changing the focal position (e.g., a lens, hereinafter, such an optical system referred to as "imaging lens" for convenience). The imaging lens may include a lens capable of changing the focal position by physically moving along the optical axis direction of the imaging lens. Alternatively, the imaging lens may include a lens capable of changing the focal position without moving along the optical axis direction of the imaging lens. A liquid lens, A liquid crystal lens, or the like are listed as the lens capable of changing the focal position without moving along the optical axis direction of the imaging lens. In this embodiment, the description will be advanced using an example in which the iris camera 20 has the liquid lens 210 as an imaging lens. Incidentally, since it is possible to apply the existing various aspects to the liquid lens, a detailed description thereof will be omitted. The iris camera 20 changes the focal position as described above by changing the applied voltage applied to the liquid lens 210.

Figure 5:
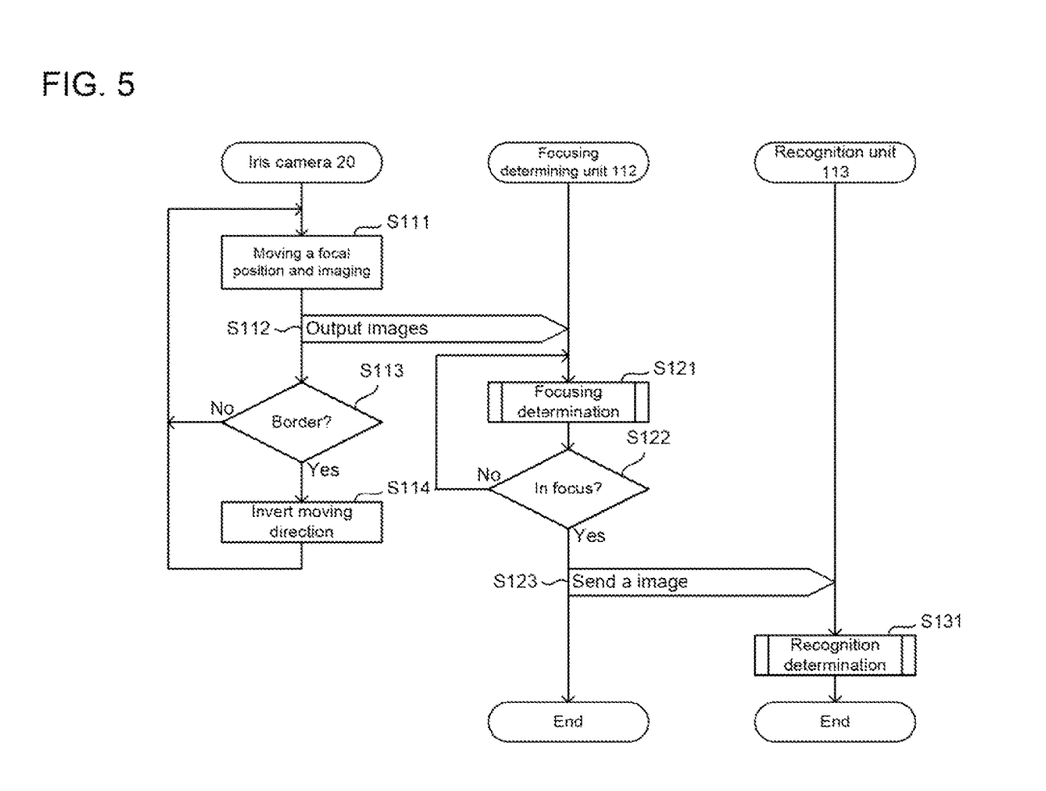
FIG. 5 is a flowchart showing an operation of the iris recognition apparatus of the embodiment.

Next, the operation of the iris recognition apparatus 1 will be described with reference to the flowchart of FIG. 5. In FIG. 5, the iris camera 20 performs imaging while changing the focal position as described above (in other words, while moving the focal length) (step S111). Incidentally, the iris camera 20 may detect the distance between the target person T and the iris camera 20, and may start imaging (i.e., the processing of the step S111 may be started) when the detected distance becomes a predetermined distance. Images imaged in the processing of the step S111 are outputted to the iris recognition unit 10 (step S112).

In parallel with the processing of the step S112, the iris camera 20 determines whether or not the focal position has reached the border (corresponding to each of positions P1 and P2 in FIG. 4) of the area, in which at which the focal position should be changed (step S113). In the processing of the step S113, if it is determined that the focal position does not reach the boundary (step S113: No), the processing of the step S111 is performed. In this case, in the processing of the step S111, the focal point is moved in the same direction as the direction in which the focal position was moved in the previous processing of the step S111. Specifically, if the iris camera 20 moves the focal position by increasing the applied voltage applied to the liquid lens 210 in the previous processing of the step S111, the focal position is moved by more increasing the applied voltage applied to the liquid lens 210. In the other case (i.e., if the iris camera 20 moves the focal position by decreasing the applied voltage applied to the liquid lens 210 in the previous processing of the step S111), the iris camera 20 moves the focal position by decreasing the applied voltage applied to the liquid lens 210.

In the processing of the step S113, if it is determined that the focal position reaches the border (step S113: Yes), the iris camera 20 reverses the direction in which the focal position moves (step S114), and the processing of the step S111 is performed. Specifically, if the iris camera 20 moves the focal position by increasing the applied voltage applied to the liquid lens 210 in the previous processing of the step S111, the iris camera 20 changes to decrease the applied voltage applied to the liquid lens 210 in the subsequent processing of the step S111. In the other cases (i.e., if the iris camera 20 moves the focal position by decreasing the applied voltage applied to the liquid lens 210 in the previous processing of the step S111), the iris camera 20 changes to increase the applied voltage applied to the liquid lens 210 in the subsequent processing of the step S111.

The iris recognition unit 10 stats from the processing of the step S121 to the processing of the step 131 of FIG. 5 while the iris camera 20 is performing the imaging processing corresponding to the processing of the step S111 to the processing of the step S114 (i.e., before the imaging processing is completed). In other words, the iris recognition unit 10 performs from the processing of the step S121 to the processing of the step S131 of FIG. 5 while the iris camera 20 is performing the imaging processing. Incidentally, as will be described later, the iris recognition unit 10 may repeatedly perform from the processing of the step S121 to the processing of the step S122 (hereinafter, referred to as "unit processing") a plurality of times. In this case, the iris recognition unit 10 may perform all of the units processing a plurality of times while the iris camera 20 is performing the imaging processing. Alternatively, the iris recognition unit 10 may perform a portion of the plurality of units processing (e.g., at least one unit processing) while the iris camera 20 is performing the imaging processing, and the iris recognition unit 10 may perform the remaining portion of the plurality of units processing after the imaging processing is completed.

Specifically, the focusing determining unit 112, which has acquired images outputted from the iris camera 20 via the image acquiring unit 111, performs the focusing determination to determine whether or not one of acquired images is a focused image in focus, i.e., whether or not the one image is in focus (step S121). Incidentally, since existing techniques can be applied to the focusing determination, a detailed description thereof will be omitted.

Subsequently, the focusing determining unit 112 determines whether or not it is determined that an image is in focus in the focusing determination of the step S121 (step S122). If it is determined that the image is not in focus in the processing of the step S122 (step S122: No), the focusing determining unit 112 performs the processing of the step S122 after changing an image as a target of the focusing determination.

If it is determined that the image is in focus in the focusing determination of the step S122 (step S122: Yes), the focusing determining unit 122 sends the image determined that it is in focus to the recognition unit 113 (step S123). The recognition unit 113 performs the recognition determination by using the image sent from the focusing determining unit 112 (step S131). Since existing technologies can be applied to the recognition determination, a detailed description thereof will be omitted.

If it is determined that the image is in focus in the processing of the step S122 (step S122: Yes), the camera controlling unit 114 may control the iris camera 20 so as to stop imaging (in other words, to complete the imaging processing). If the recognition is normally ended in the recognition determination of the step S131, the camera controlling unit 114 may control the iris camera 20 so that the focal position becomes the initial position, or may control the iris camera 20 so as to be in the predetermined power saving mode.

(Technical Effects)

In the iris recognition apparatus 1, images, that are sequentially outputted from the iris camera 20, are sequentially performed the focusing determination. In other words, in the iris recognition apparatus 1, the focusing determination is started while images are sequential outputted from the iris camera 20 (i.e., before the imaging processing is completed). Then, the recognition determination is performed by using the image determined that it is in focus in the focusing determination. Therefore, the iris recognition apparatus 1 can reduce the time required for the iris recognition in comparison with the comparative example, which starts a focusing determination and a recognition determination after imaging a plurality of images is ended while changing a focal position in a predetermined area (i.e., starts a focusing determination and a recognition determination after an imaging processing is completed).

In addition, if the iris camera 20 has the liquid lens 210 (or an imaging lens including a lens, which can change a focal position without moving along an optical axis), in the iris recognition apparatus 1, the iris camera 20 changes the focal position by changing the applied voltage applied to the liquid lens 210. Therefore, it is possible to reduce the time required for the iris recognition and to suppress failure of the iris camera 20 in comparison with the comparative example, which changes a focal position by moving an imaging lens physically, for example.

<First Modification>

It takes some time T11 after the iris camera 20 changes the applied voltage applied to the liquid lens 210, by the state of the liquid lens 210 actually becomes the state corresponding to the applied voltage. Consider the relationship between the time-interval Tfps (=1/fps) of each image frame determined by the frame rate fps of the iris camera 20, and the above-mentioned T11.

Figure 6:
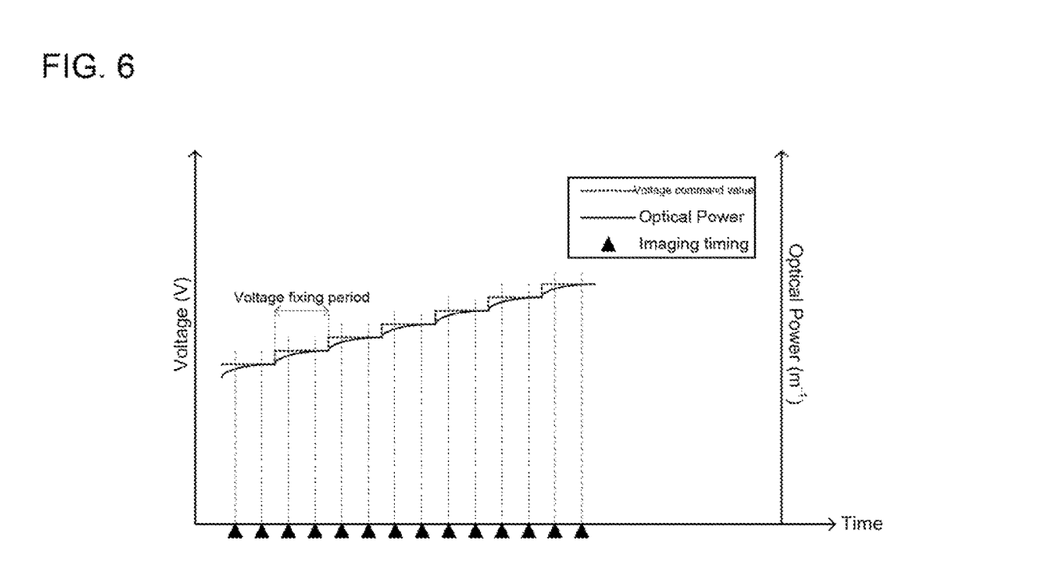
FIG. 6 is a diagram showing an example of a relationship between an applied voltage applied to a liquid lens and an imaging timing.

If the above-mentioned T11 is longer than the above-mentioned Tfps, it is not possible to guarantee to obtain an image at the expected focal position from the applied voltage by imaging while continuously changing the applied voltage. Therefore, it is desirable to configure the iris camera 20 so as to maintain the applied voltage for a predetermined period (corresponding to the "voltage fixing period" in FIG. 6) from a time point at which the applied voltage applied to the liquid lens 210 is changed. With this configuration, it is possible to image considering the above-mentioned T11. Incidentally, the "Optical Power" in FIG. 6 is an inverse of the focal length, and corresponds to the focal position.

In addition to the above, even if the above-mentioned T11 is shorter than the above-mentioned Tfps, it is desirable to consider the relationship to the exposure time Texp (Texp≤Tfps) of each image frame. In other words, if the above-mentioned T11 is longer than the above-mentioned Texp, it is not possible to guarantee to obtain an image at the expected focal position from the applied voltage. Therefore, if the above-mentioned T11 is longer than the above-mentioned Texp, it is desirable to configure the iris camera 20 so as to maintain the applied voltage for a predetermined period of time from a time point at which the applied voltage applied to the liquid lens 210 is changed in the same manner as described above. Here, the iris camera 20 may be configured to image a plurality of images during the predetermined period (corresponding to the "voltage fixing period" in FIG. 6). In other words, the iris camera 20 may image a plurality of images at the same applied voltage.

Furthermore, in addition to the above, it is desirable to consider the above-mentioned T11 as a delay. In other words, it may be considered that an image at the focal position expected from the applied voltage is obtained delayed. It is possible to image an image in focus at each border position, which is originally desired, by little expanding the border of an area, in which a focal position should be changed, for example.

<Second Modification>

The focusing determining unit 112 may perform the focusing determination on an image each time a new image is imaged by the iris camera 20 in the imaging processing (i.e., from the processing of the step S111 to the processing of the step S114 in FIG. 4). It is not limit that the focusing determining unit 112 targets for the focusing determination an image, which is the new image imaged by the iris camera 20.

<Third Modification>

Figure 7:
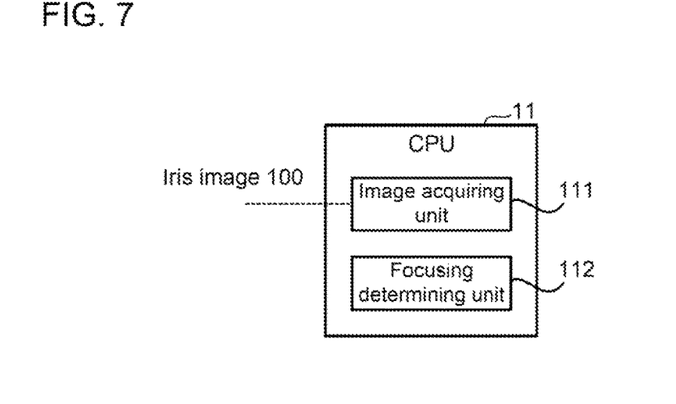
FIG. 7 is a block diagram showing functional blocks implemented in a CPU provided in an iris recognition unit of a third modification of the embodiment.

As shown in FIG. 7, the image acquiring unit 111 and the focusing determining unit 112 are realized in the CPU 11 of the iris recognition unit 10, but function blocks other than the image acquiring unit 111 and the focusing determining unit 112 may not be realized.

Application Example

Figure 8:
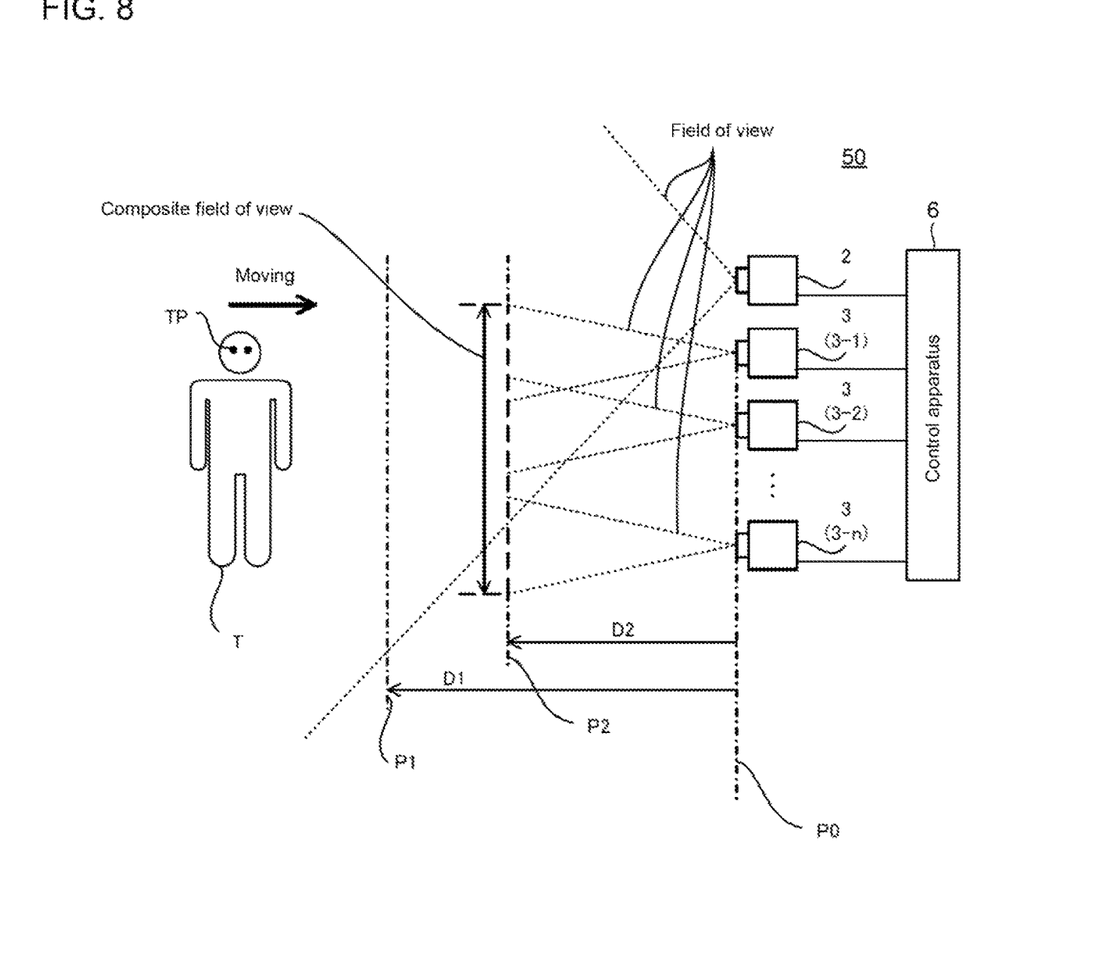
FIG. 8 is a diagram showing a configuration of an iris recognition system of an application example.

The iris recognition apparatus 1 as described above may be employed as a part of the iris recognition system 50 as shown in FIG. 8. The iris recognition system 50 performs an iris recognition operation that performs recognition of the target person T based on an iris pattern of the target person T (e.g., human). The iris recognition system 50 may be employed, for example, as a part of a system for automating entry and exit procedures at airports, so-called ABC (Automated Border Control). In this case, the iris recognition system 50 may be a walk-through type iris recognition system recognizing a moving target person T.

The iris recognition system 50 comprises a whole camera 2, a plurality of iris cameras 3, and a control apparatus 6. The iris recognition unit 10 of the iris recognition apparatus 1 as described above may constitute a part of the control apparatus 6. The whole camera 20 of the iris recognition apparatus 1 as described above may constitute the whole camera 2. The iris camera 30 of the iris recognition apparatus 1 as described above may constitute each of the plurality of iris cameras 3. The whole camera 2 is configured to be capable of imaging the target person T with a field of view, which is wider than the field of view of each of the plurality of iris cameras 3. The "field of view of a camera" means a range that includes a scene that can be imaged by the camera, and may be referred to as an imaging range.

Here, it is assumed that the target person T passes in order of a point P11, a point P12 and a point P0 toward the iris recognition system 50. The distance from the point P0 to the point P11 is the distance D1. The distance from the point P0 to the point P12 is a distance D2, which is shorter than distance D1. The whole camera 2 images the target person T located at the point P11. The control apparatus 6 identifies where a target part TP (corresponding to the "gaze area" as described above) of the target person T is located in the whole image from the whole image imaged by the whole camera 2. Then, the control apparatus 6 determines an iris camera 3, which images the target part TP of the target person T located at the point P12, from the plurality of iris cameras 3. Thereafter, the control apparatus 6 performs recognition of the target person T based on an iris pattern obtained from an iris image imaged by the determined iris camera 3. For more information on the iris recognition system 50, see, for example, Japanese Patent Application Laid Open No. 2019-026937.

<SUPPLEMENTARY NOTES>

In regard to the embodiments explained above, the following supplementary notes are further disclosed.

(Supplementary Note 1)

An iris recognition apparatus according to a supplementary note 1 is an iris recognition apparatus for performing recognition of a target person based on an iris pattern of the target person, comprising: an imaging device that performs an imaging processing for sequentially outputting imaged images while changing a focal position; and a determining device that starts a focusing determination for determining whether or not an image is a focused image before the imaging device completes the imaging processing.

(Supplementary Note 2)

An iris recognition apparatus according to a supplementary note 2 is the iris recognition apparatus according to the supplementary note 1, wherein the determining device performs the focusing determination for one image each time one image is imaged in the imaging processing.

(Supplementary Note 3)

An iris recognition apparatus according to a supplementary note 3 is the iris recognition apparatus according to the supplementary note 1, wherein the iris recognition apparatus further comprises a controlling device that controls the imaging device so as to stop imaging on condition that it is determined that the image is a focused image in the focusing determination.

(Supplementary Note 4)

An iris recognition apparatus according to a supplementary note 4 is the iris recognition apparatus according to the supplementary note 1, wherein the imaging device, in the imaging processing, changes the focal position from a first position on an optical axis to a second position, which is different from the first position, on the optical axis, and then changes the focal position from the second position to the first position.

(Supplementary Note 5)

An iris recognition apparatus according to a supplementary note 5 is the iris recognition apparatus according to the supplementary note 1, wherein the imaging device has a liquid lens as an imaging lens, and changes the focal position by changing an applied voltage applied to the liquid lens.

(Supplementary Note 6)

An iris recognition apparatus according to a supplementary note 6 is the iris recognition apparatus according to the supplementary note 5, wherein the imaging device maintains the applied voltage for a predetermined period from a time point at which the imaging device changes the applied voltage.

(Supplementary Note 7)

An iris recognition apparatus according to a supplementary note 7 is the iris recognition apparatus according to the supplementary note 6, wherein the imaging device images a plurality of images in the predetermined period.

(Supplementary Note 8)

An iris recognition apparatus according to a supplementary note 8 is the iris recognition apparatus according to the supplementary note 6, wherein the imaging device images periodically in the imaging processing, the predetermined period is set so as to at least one image is imaged by end of the predetermined period.

(Supplementary Note 9)

An iris recognition method according to a supplementary note 9 is an iris recognition method for performing recognition for a target person based on an iris pattern of the target person in an iris recognition apparatus having an imaging device, the iris recognition method comprising: the imaging device performing an imaging processing for sequentially outputting imaged images while changing a focal position; and starting a focusing determination for determining whether or not an image is a focused image before the imaging device completes the imaging processing.

(Supplementary Note 10)

A computer program according to a supplementary note 10 is a computer program for causing a computer to execute the iris recognition method according to the supplementary note 9.

(Supplementary Note 11)

A recording medium according to a supplementary note 11 is a recording medium on which the computer program according to the supplementary note 10 is recorded.

This disclosure can be modified as appropriate in a range not contrary to the claimed range and the subject matter or philosophy of this disclosure which can be read from the entire specification, and an iris recognition apparatus, an iris recognition method, a computer program and a recording medium with such modifications are also included in the technical philosophy of this disclosure.

DESCRIPTION OF REFERENCE NUMERALS AND LETTERS

1 . . . iris recognition apparatus
10 . . . iris recognition unit
20 . . . iris camera
111 . . . image acquiring unit
112 . . . focusing determining unit
113 . . . recognition unit
114 . . . camera controlling unit

What is claimed is:

1. An iris recognition apparatus for performing recognition of a target based on an iris pattern of the target, comprising:
   at least one memory configured to store instructions; and
   at least one processor configured to execute the instructions to:
      perform an imaging processing for sequentially outputting images while changing a focal position for capturing the images by a sequence of maintaining an applied voltage to a liquid lens for a predetermined time after at least one of increasing the applied voltage to the liquid lens and decreasing the applied voltage to the liquid lens, wherein the predetermined time is less than the time interval between each image captured within the sequence;
      start a focusing determination for determining whether or not an image, among the sequentially output images, is a focused image before the imaging processing is completed; and
      start a recognition determination of an iris by using the image determined to be the focused image;
      stop the imaging processing on condition that it is determined that the image is the focused image in the focusing determination; and
      not start the recognition determination of the iris until the image is determined to be the focused image.

2. The iris recognition apparatus according to claim 1, wherein the at least one processor is further configured to execute the instructions to perform the focusing determination for one image each time an image is output by the imaging processing.

3. The iris recognition apparatus according to claim 1, wherein the at least one processor is, in the imaging processing, further configured to execute the instructions to change the focal position from a first position on an optical axis to a second position, which is different from the first position, on the optical axis, and then change the focal position from the second position to the first position.

4. The iris recognition apparatus according to claim 1, wherein
   the iris recognition apparatus has the liquid lens as an imaging lens, and
   the at least one processor is further configured to execute the instructions to change the focal position by changing the applied voltage applied to the liquid lens.

5. The iris recognition apparatus according to claim 4, wherein the at least one processor is further configured to execute the instruction to maintain the applied voltage for the predetermined period from a time point at which the applied voltage is changed.

6. The iris recognition apparatus according to claim 5, wherein the at least one processor is further configured to execute the instructions to capture a plurality of images in the predetermined period.

7. The iris recognition apparatus according to claim 5, wherein
   the at least one processor is further configured to execute the instructions to capture the images periodically in the imaging processing,
   the predetermined period is set such that at least one image is captured within the predetermined period.

8. An iris recognition method for performing recognition for a target based on an iris pattern of the target in an iris recognition apparatus having at least one memory configured to store instructions; and at least one processor configured to execute the instructions, the iris recognition method comprising:

performing, by the at least one processor, an imaging processing for sequentially outputting images while changing a focal position for capturing the images by a sequence of maintaining an applied voltage to a liquid lens for a predetermined time after at least one of increasing the applied voltage to the liquid lens and decreasing the applied voltage to the liquid lens, wherein the predetermined time is less than the time interval between each image captured within the sequence;

starting a focusing determination for determining whether or not an image, among the sequentially output images, is a focused image before the at least one processor completes the imaging processing;

starting a recognition determination of an iris by using the image determined to be the focused image;

stopping the imaging processing on condition that it is determined that the image is the focused image in the focusing determination; and     not starting the recognition determination of the iris until the image is determined to be the focused image.

9. A non-transitory computer readable medium on which the a computer program according for causing a computer to execute an iris recognition method for performing recognition for a target based on an iris pattern of the target in an iris recognition apparatus having at least one memory configured to store instructions; and at least one processor configured to execute the instructions, the iris recognition method comprising:

performing, by the at least one processor, an imaging processing for sequentially outputting images while changing a focal position for capturing the images by a sequence of maintaining an applied voltage to a liquid lens for a predetermined time after at least one of increasing the applied voltage to the liquid lens and decreasing the applied voltage to the liquid lens, wherein the predetermined time is less than the time interval between each image captured within the sequence;

starting a focusing determination for determining whether or not an image, among the sequentially output images, is a focused image before the at least one processor completes the imaging processing is recorded;

starting a recognition determination of an iris by using the image determined to be the focused image;

stop the imaging processing on condition that it is determined that the image is the focused image in the focusing determination; and     not start the recognition determination of the iris until the image is determined to be the focused image.

\* \* \* \* \*